United States Patent [19]
Linder et al.

[11] Patent Number: 4,489,596

[45] Date of Patent: Dec. 25, 1984

[54] SPARK PLUG WITH MEASURING MEANS

[75] Inventors: Ernst Linder, Mühlacker; Helmut Maurer, Vaihingen; Klaus Müller, Tamm, all of Fed. Rep. of Germany

[73] Assignee: Robert Bosch GmbH, Stuttgart, Fed. Rep. of Germany

[21] Appl. No.: 478,267

[22] Filed: Mar. 24, 1983

[30] Foreign Application Priority Data

May 13, 1982 [DE] Fed. Rep. of Germany ....... 3217951

[51] Int. Cl.[3] ............ G01M 15/00

[52] U.S. Cl. ............ 73/116; 73/26; 73/115; 313/137

[58] Field of Search ............ 73/116, 26, 115; 313/118, 137, 141; 315/32; 123/169 R, 169 PB; 374/144

[56] References Cited

U.S. PATENT DOCUMENTS

| | | | |
|---|---|---|---|
| 1,784,541 | 12/1930 | Rouillard . | |
| 2,046,650 | 7/1936 | Nowosielski | 123/169 |
| 2,130,208 | 9/1938 | Vincent | 313/137 X |
| 2,963,620 | 12/1960 | Knudson et al. | 123/169 R X |

FOREIGN PATENT DOCUMENTS

| | | |
|---|---|---|
| 1015623 | 3/1958 | Fed. Rep. of Germany . |
| 7001121 | 6/1970 | Fed. Rep. of Germany . |
| 2310586 | 9/1973 | Fed. Rep. of Germany . |
| 2930013 | 2/1980 | Fed. Rep. of Germany . |
| 3028359 | 2/1981 | Fed. Rep. of Germany . |
| 3008963 | 9/1981 | Fed. Rep. of Germany . |
| 3122861 | 12/1981 | Fed. Rep. of Germany . |
| 3138547 | 5/1982 | Fed. Rep. of Germany . |
| 3109896 | 9/1982 | Fed. Rep. of Germany . |
| 3203149 | 10/1982 | Fed. Rep. of Germany . |
| 153046 | 4/1978 | Japan . |
| 314307 | 5/1930 | United Kingdom . |

*Primary Examiner*—Jerry W. Myracle

*Attorney, Agent, or Firm*—Frishauf, Holtz, Goodman & Woodward

[57] ABSTRACT

An elongated plate element, for example of aluminum oxide, or a metal plate which is coated with an insulator such as aluminum oxide, is retained within a hollow spark plug insulator (15) by a sealing mass (38), for example a sinter compound, sintering together the plate element (37) and the insulator body (35). The plate element carries a strip or conductive track layer electrode (25) thereon, located, for example, on one major surface of the plate; at the ignition end, the plate may have a through-hole (52), plated through, so that the ignition electrode will have conductive portions at both sides of the plate, faced by ground electrode portions which likewise can be retained on plate-like carrier elements, and connected to the metal housing (11) of the spark plug via conductive tracks (60, 61) and a conductive sealing ring (17"). The plates can carry heaters (32) and operation sensors, such as gas composition sensor, temperature sensor, pressure sensor or the like, which may, for example, have one electrode connected to ground or chassis, and hence to the metal housing, and the other electrode carried along in strip form to the connecting end portion of the spark plug. The plate and layer-like construction of the insulating elements permits modular combination of required components having the desired operating and/or sensing characteristics, and are suitable for mass production assembly.

18 Claims, 16 Drawing Figures

37/3"
37/5"
37/1"
37/2"
38"
37/4"

XII
61
60
38"
37/5"
24"/2
26"/5
64
39"
65
37/3"
37/1"
37/4"
35"
24"/1
26"/4
59
58
40"
37/2"
11"
17"
18"
16"

10"
15"
35"
36"
11"
23"
37/1"
37/3"
37/2"

25'/1
44/1
45/1
50

25'/2
44/2
51
45/2

40'/1
25'/3a
45/3
52
37/1'a

25/3
44/3
39'/1
45/3

49
45'
45
46
39'
25'
44

SPARK PLUG WITH MEASURING MEANS

Reference to related patents and patent publications:

British Pat. No. 314 307, HAMM

U.S. Pat. No. 1,784,541, ROUILLARD

U.S. Pat. No. 2,046,650, NOWOSIELSKI

U.S. Pat. No. 3,130,208, VINCENT

Japanese Publication No. 153 046/77, HITACHI SEISAKUSHO K.K.

German Utility Model DE-GM No. 70 01 121, BERU-WERK

German Pat. No. 267,606, SIEMENS et al

German Pat. No. 1,015,623, BROSA

German Patent Disclosure Document DE-OS No. 23 10 586, YATO et al.

German Patent Disclosure Document DE-OS No. 29 30 013, DOUAUD et al.

German Patent Disclosure Document DE-OS No. 31 09 896, LINDER

U.S. Patent Applications assigned to the assignee of this invention, and incorporated herein by reference:

U.S. Ser. No. 214,481, filed Dec. 9, 1980, MULLER et al., now U.S. Pat. No. 4,393,687, July 19, 1983

U.S. Ser. No. 346,034, filed Jan. 26, 1982, DOBLER et al now continuation Ser. No. 597,588, filed Apr. 10, 1984

German Patent Disclosure Documents DE-OS Nos. 32 06 903 29 13 866 32 03 149 30 08 963 20 56 235 28 55 012 31 38 547 31 22 861 29 07 032 29 09 201.

British Pat. No. 2,049,952 (=U.S. Pat. No. 4,324,632, TANTRAM et al.)

The present invention relates to a spark plug for an internal combustion (IC) engine, and more particularly to a spark plug construction in which the center or sparking electrode is formed as a conductive path or conductive track on an insulating substrate which, preferably, is in elongated plate form, retained within a tubular insulator sealingly seated in a metal housing.

BACKGROUND

Various types of spark plugs which have multi-element insulators are known. German Patent DE-PS No. 267 606 describes a spark plug which has a metal housing in which a multi-part insulator is positioned. The subdivision of the insulator elements is transverse to the longitudinal extent of the spark plug, so that the insulator element closest to the ignition end can be removed and replaced in case of damage thereto.

German Patent Disclosure Document DE-OS No. 30 01 711 to which U.S. Ser. No. 214,481, now U.S. Pat. No. 4,393,687 corresponds, describes a spark plug having a pre-ignition chamber in which a center electrode is used formed as a conductive track on the inside of an insulator which covers the inside of the pre-ignition chamber. The conductive track has interruptions to form a pre-sparking gap. The center electrode is connected at the terminal end to a metallic rod or post, secured in the spark plug insulator.

German Patent Disclosure Document DE-OS No. 31 09 896 describes a different type of spark plug having a pre-ignition chamber in which a layer-like center electrode is applied on the end portion of the insulator at the ignition side, the layer electrode being connected to a metal wire which leads, as well known, through an axial inner bore of the insulator.

Japanese Patent Disclosure Document No. 153 046/77 describes a spark plug in which the electrical connection between a terminal or connecting bolt or post and the center electrode includes an electrical resistance layer which is applied on the surface of the insulator within the inner axial opening thereof.

Various types of spark plugs have been proposed which include electrical heater elements at the ignition end portion thereof. For example, and as shown in German Patent Disclosure Document DE-OS No. 23 10 586, such a heater element may be secured directly within the center electrode. U.S. Pat. No. 2,046,650 describes a heater in the form of a heater spiral located between the insulator and the metallic housing. U.S. Pat. No. 2,130,208 shows a heater which is secured, in ring form, within the metal housing and spaced from the metallic center electrode. U.S. Pat. No. 1,784,541 shows a spark plug in which a heater is positioned within the metal housing ahead of the spark gap. British Pat. No. 314,307 shows a spark plug in which a heater is located within the metal housing at the ignition end portion thereof.

All the various constructions of spark plugs with heater exemplified by the referenced patents can be constructed only with substantial expense, or have a heat capacity which is high; or are subject to misfires and/or malfunction.

The spark plug, which is screwed through the cylinder head of an IC engine provides a convenient unit to hold not only the actual spark gap, but additional structures and arrangements which are desirable or useful to have to sense the combustion conditions occurring within the combustion chamber. German Patent Disclosure Document DE-OS No. 30 28 188 to which U.S. Ser. No. 346,034, filed Jan. 28, 1982 DOBLER et al., corresponds describes, for example, the combination of a pressure sensor with a spark plug, located at the ignition end portion of the spark plug. To provide a pressure output, a pressure sensitive wire is used. Another type of spark plug which includes a pressure sensor is described in German Patent DE-PS No. 1 015 623, which utilizes a piezo-electrical element as the pressure sensor.

Other types of sensors may be combined with spark plugs, thereby avoiding the necessity of forming the cylinder chamber of the IC engine with which they are to be used with yet another opening, which has to be threaded and sealed by the sensor. For example, German Patent Disclosure Document DE-OS No. 29 30 013 describes a spark plug in combination with an ion current sensor which measures the electrical conductivity of the gases between adjacent electrodes.

Oxygen sensors can be combined with spark plugs, see for example German Patent Disclosure Document DE-OS No. 30 28 359, which describes a spark plug having an oxygen sensor positioned adjacent the ignition end portion thereof. To measure the partial oxygen pressure, a rotation-symmetrical sensor is embedded at the tip portion of the insulator, and connected to the connection portion of the insulator over platinum-conductive tracks, which are introduced into suitable openings in the form of a platinum suspension, dripped into the openings. The sensor element itself is an oxygen ion conductive solid electrolyte body, such as for example zirconium dioxide, supplied with suitable electrodes in layered or sandwich construction.

Sensing of temperature in the combustion chamber has also been proposed—see, for example, German Utility Patent DE-GM No. 70 01 121, which describes a thermal element integrated with a spark plug. This publication includes references to other features which can be used in combination with spark plugs.

It has been found that the constructions described in all the aforementioned publications result in sensor-spark plug combinations which are expensive to make, and require, for suitable operation and efficient use, more space than usually available at the ignition end of a spark plug. It is hardly ever possible to combine more than one additional element besides the center electrode and the conduction lines therefor with the terminal portion of the spark plug; thus, combination of a heater and a sensor is not practical.

THE INVENTION

It is an object to so construct a spark plug that its center electrode can be easily introduced into the insulator, and further is so arranged that the spark plug can be combined with a plurality of additional operating or sensing structures, such as heaters, combustion, temperature, pressure sensors, or the like.

Briefly, an insulator is sealingly secured in the metal housing of a spark plug; the metal housing itself can be of standard well known construction. The insulator is formed with an inner opening in which a second insulator is secured, extending longitudinally thereof. The second insulator may be a single elongated insulator carrier element, for example and preferably in form of a plate, which is held within the insulator in sealed, pressure-resistant manner, for example by being cemented therein, held by a ceramic mass sintered to the insulator, or the like. The insulator carrier element has the center electrode applied thereto, for example, in form of a layer or track, to position the center electrode in proper relation with respect to a counter electrode and forming a spark gap therewith.

The carrier element can be in the form of a composite structure, that is, with a plurality of plate elements which, respectively, carry heaters, sensor elements, or the like; and, additionally, the side of the carrier element remote from the one on which the center electrode is applied may also be used as a support surface for a heater, sensors of any of various types, or the like.

The structure has the advantage that it provides a composite spark plug—operating element structure which can be easily made, readily assembled, and which is reliable. Further, it permits manufacture by use of existing mass production apparatus. The spark plug—operating element combination can be arranged in modular form so that, depending on the desired application, a standard or basic metal housing and main insulator can have assembled thereto the support carrier for the main electrode and then, as desired and in accordance with a required operating characteristic, respectively, heating elements, sensors of various types and the like. A single basic structure, to which respective elements are then applied, can be used for modular assembly. If no additional support structures are required, a blank ceramic element may be inserted rather than one carrying a sensor, if the initial dimensioning was arranged for more than one support or carrier element.

The arrangement of sensors, heating elements, and the like, as well as of the center electrode, in form of layers permits construction of particularly compact spark plugs.

DRAWINGS

DETAILED DESCRIPTION

Figure 3:
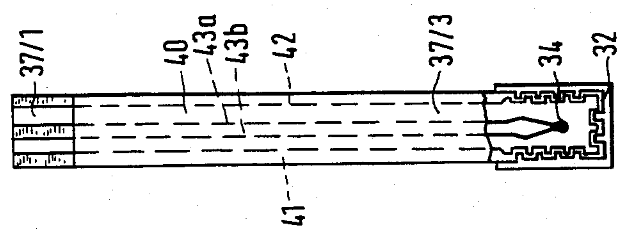
FIG. 3 is a plan view of the back side of the insulator carrier element of FIG. 2.
Figure 2:
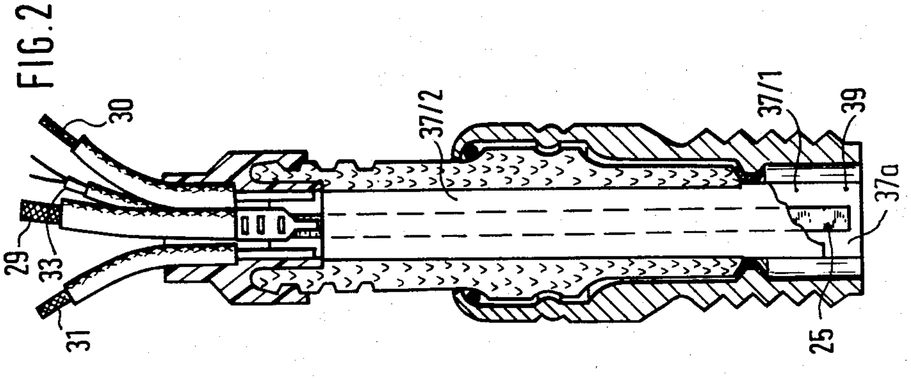
FIG. 2 illustrates the spark plug of FIG. 1, but rotated by 90°, to illustrate elements not visible in FIG. 1.
Figure 1:
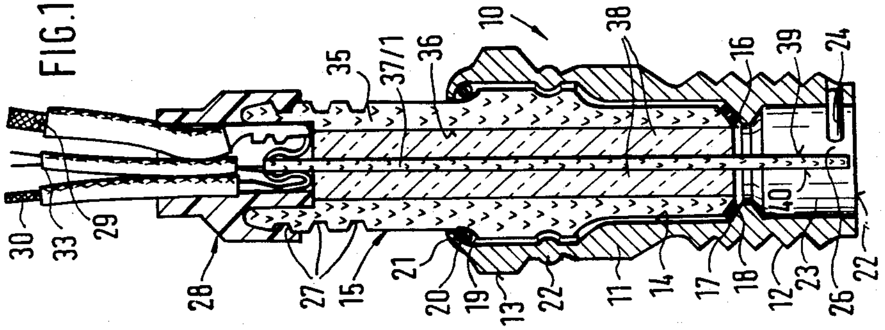
FIG. 1 is a schematic longitudinal view, to an enlarged scale, of a spark plug having an outer insulator, a plate-like insulator carrier element therein, and a retention mass, in which a layer-like center electrode is applied to the plate-like insulator element which, further, has a heater and a thermal element applied thereto.

The spark plug of FIGS. 1–3 has a metal housing 11 formed, at its outside, in customary manner with a threaded portion 12 and a hexagonal surface 13 to receive a spark plug socket wrench. The spark plug 10 is designed for introduction through a tapped opening in the wall of the cylinder head of an internal combustion (IC) engine (not shown). The metal housing is tubular and has an inner opening 14 which surrounds and retains an essentially tubular, rotation-symmetrical insulator 15. The insulator 15 has a frusto-shaped ignition end surface 16, which is seated with interposition of a sealing ring 17 on a conical portion 18 within the inner opening 14 of the metal housing 11. The outer side of the insulator 15 has an upper shoulder 19 which, with interposition of a second sealing ring 20, is retained in the metal housing by a rolled-over edge 21 of the housing 11. The insulator 15 is tightly and sealingly retained within the housing 11 which, preferably, is subjected to a heat-shrinking process, resulting in a heat shrink portion 22. Various other arrangements to hold the insulator 15 within the metal housing 11 may be used, for example the insulator may be secured within the metal housing by a cement, by a glass melt, or the like.

The shoulder 18, formed in the inner opening of the metal housing 11, is spaced from the ignition end portion 22 of the metal housing 11 by a distance which is so arranged that a pre-ignition chamber 23 is formed. The present invention is not limited to use with spark plugs having a pre-ignition chamber 23; it may be used with any type of spark plug, for example such which do not have such a chamber 23.

A counter electrode 24 is provided which, in the embodiment illustrated, extends radially inwardly in the pre-ignition chamber 23. The counter electrode 24 is secured to the metal housing in any well known and suitable manner, for example by welding. It is so dimensioned and positioned that its free end is opposite the center electrode 25—see FIG. 2. A spark gap of, for example, 0.7 mm will be left between the center electrode 25 and the end of the counter electrode 24, to form the ignition or spark gap 26 for ignition of an air-fuel mixture.

The terminal end portion of the insulator 15 is formed with ring grooves 27—as well known and as is customary—to provide an elongated creep path, and prevent leakage or creep currents from passing along the outside of the insulator. The upper end portion is preferably so shaped that it can be used to receive in fitted, preferably polarized arrangement, the plug element of a connecting plug 28. The plug element preferably includes an elastic cap, made of a heat-resistant material, such as silicone rubber, to fit sealingly, on the connecting portion of the insulator 15. The plug elements retains, in sealed connection, an electrical cable 29, electrically connected to the center electrode 25, and, further, positive and negative connecting cables 30, 31 for a heater 32 which is supported within the insulator 15. Additionally, further cables may be connected, for example a connection cable 33 for a temperature sensor 34 (FIG. 3), likewise fitted within the insulator 15. Various types of connection terminals may be used, and any standard and suitable connection can be employed. In one form, the connection terminals described in German Patent Disclosure Document DE-OS No. 32 06 903, filed Feb. 26, 1982, Bayha et al is suitable.

The insulator 15 is formed as a rotation-symmetrical tubular structure 35 which, at its outside, has the shoulder 19 and the grooves 27 which project beyond the metal housing 11 to receive the cover cap. At its ignition end, it is generally conical and terminates in a flat surface 16. The insulator 35 usually, and preferably, is made of aluminum oxide, but may use any other suitable and customary ceramic material. It has a longitudinal opening 36 extending therethrough. The diameter of the longitudinal opening 36 is, suitably, about 6 mm, and is provided to receive an insulating carrier element 37/1. The insulating carrier element 37/1, in the first embodiment, is made, for example, of the same material as the insulator 15, for example aluminum oxide, in the form of an elongated plate having a width, in the example given, of 5.8 mm and a thickness of 0.8 mm. Its ignition end portion extends into the pre-ignition chamber 23 of the spark plug 10. The terminal end portion ends within the longitudinal opening 36 of the insulator 35.

The carrier plate 37/1 is held in the longitudinal opening 36 by an insulating carrier mass 38. A suitable material for mass 38, which is also a sealing mass, is cement, glass melt, or ceramic. This mass securely and sealingly retains the insulator plate 37/1 in the insulator 15.

In accordance with a preferred feature of the invention, the insulator 37/1 is assembled with the insulator 35 this way: The insulator 37/1 is introduced into the longitudinal bore, after the insulator 35 has been completely sintered. Thereafter, a ceramic sealing mass 38 is introduced; it is also possible, however, to only pre-sinter the insulator 35, that is, to sinter the insulator body 35 at a temperature of up to about 1000° C., so that it is not completely sintered. In that case, the insulator 37/1, with its elements applied thereon, preferably also is only pre-sintered and then is finish-sintered together with the insulator 35 and the ceramic sealing mass 38. Otherwise, the ceramic sealing mass 38, only, is sintered to the finish-sintered insulator body 35 and the carrier element 37/1.

The insulating carrier element 37/1 has a first major surface 39, on which the center electrode 35 is formed. The center electrode 35 is constructed in layer form, extending in form of a conductive track from the terminal portion at the terminal end to the ignition end portion. The conductive track has a width of about 2.5 mm and may be reinforced in the region of the spark gap 26. The center electrode 25 is made of a material which is highly resistant to sparking and burn-off. A suitable metal is a platinum metal, preferably including a ceramic, for example 30% by volume of aluminum oxide. Platinum itself is a suitable metal. The center electrode 25 has a thickness of about 0.06 mm. Its dimensions can be matched to the particular use of the spark plug 10, and to the requirements of the engine with which it is to be assembled.

The center electrode 25 can be applied to the plate-like insulator 37/1 in accordance with any known and suitable process, for example by rolling-on, printing, or the like. Preferably, the insulator plate 37/1 is prepared, and then the center electrode 25 is applied thereto before sintering, or even partially sintering the insulator plate 37/1. Preferably, any other components or elements also to be applied to the insulator plate 37/1 are applied thereto before sintering, and then carrying out only a single sintering or pre-sintering step. Any other insulator elements to be applied thereto are also, preferably, applied to the insulator plate 37/1 before sintering or pre-sintering.

After the center electrode 25 has been applied to the insulator plate 37/1, a second insulating element 37/2 is applied thereto, leaving, however, the connecting region of the center electrode 25 uncovered and, preferably, also that portion thereof which is opposite the ground or chassis electrode 24. The second insulating element 37/2, for example, is an insulating layer having a thickness of about 0.02 mm, and may be made of aluminum oxide or, for example, magnesium spinel. An additional burn-off or sparking resistant layer 37*a* can be applied to the insulating plate 37/1 in the region of the spark gap 26, located below the corresponding region of the center electrode 25 and on the surrounding zone. Beryllium oxide is a suitable material.

The second major surface 40—see FIG. 3—of the center electrode plate or carrier 37/1 has a heater 32 located in the region of the ignition end portion thereof. The heater element 32 is placed on the marginal or edge zones of the insulating plate 37/1, and preferably is formed as a conductive track or path in meander or zig-zag or crenelated configuration. The heater element 32 is a layer structure, made of a heat-resistant, burn and spark-resistant material, for example platinum or a platinum metal, and, together with its conductive tracks 41, 42 is applied to the second major surface 40, before sintering, and in form of a sinterable conductive strip by any suitable process, for example by printing. Heater elements of this type are described, for example, in German Patent Disclosure Document No. 29 13 866 (corresponding with U.S. Pat. No. 4 300 990, MAURER).

The second major surface 40 of the insulator plate 37/1 additionally carries a sensing element 34 which, in this embodiment, is formed as a temperature sensor. The temperature sensor is so arranged that the heater element 32 surrounds the measuring position of the temperature sensor with some distance. A layer-like thermo couple or thermo element is suitable. Such a layer-like thermo element may be formed, for example, by one leg 43*a* of platinum and another leg 43*b* of platinum-rhodium. The legs 43*a*, 43*b* preferably contain about 40% (by volume) of ceramic compositions, for example aluminum oxide. A suitable thickness is about 0.008 mm.

Temperature sensors 34 of this type, in combination with spark plugs, by and themselves are known—see German Patent Disclosure Document DE-OS No. 32 03 149, filed Jan. 30, 1982, ESPER et al. Other types of layer-like temperature sensors or temperature sensing systems may be used.

Heater element 32 and temperature sensor 34, and the respective connecting lines or conductive tracks 41, 42 or the legs 43, are covered by a protective insulating coating 37/3 which covers the respective conductive tracks but leaves only the connecting regions of the respective conductors 41, 42 of the heater 32 and the connecting regions of the legs 43*a*, 43*b* of the temperature sensor 34 without a coating or cover. The third insulating cover 37/3 may be identical with respect to material and application process to the insulating cover 37/2, that is, may for example be a layer of 0.02 mm of aluminum oxide or magnesium spinel, applied by printing or spraying.

Various changes and modifications may be made in the construction and arrangement of the elements of the spark plugs 10.

The insulator plate 37/1 need not be a ceramic plate; it may be a metal plate, coated with an insulating coating. If a metal plate, then, preferably, the metal should be a good heat-conductive metal, for example a copper alloy. The metal plate then should be coated with a ceramic cover, for example aluminum oxide or beryllium oxide; with an enamel, or with glass, for example quartz glass. The metal plate could then be used directly as the center electrode and, if so used, should be covered with a material which is resistant to sparking or burn-off, when forming the spark gap directly. German Patent Disclosure Document DE-OS No. 30 08 963, filed Mar. 8, 1980, LATSCH et al, describes an arrangement in which a metallic cover, formed as a heat tube, is used as a center spark plug element. If such a spark plug should, additionally, have heaters and/or sensors associated therewith, then they are preferably applied on the electrically insulating coating of the metal plate. Alternatively, and preferably, however, they are applied to a separate insulating element, in known manner, and therafter joined or bonded to the plate-like center electrode.

The respective separate constructional components can then be bonded together by a glass melt or glass solder, and then directly assembled in the metal housing; or, alternatively, first assembled and fitted and sealed into the tubular insulator 15 for subsequent assembly in the metal housing.

Figure 4:
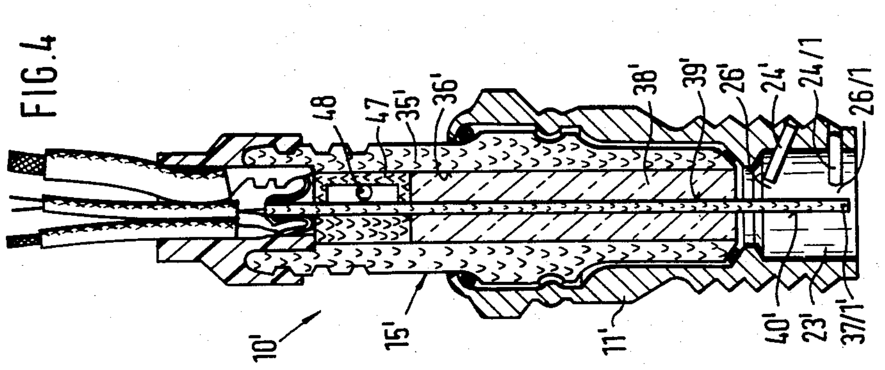
FIG. 4 is a longitudinal section similar to FIG. 1 of another embodiment of the invention, with a pre-spark gap.
Figures 5, 6, 7, 8, 9, 10, 11, 12:
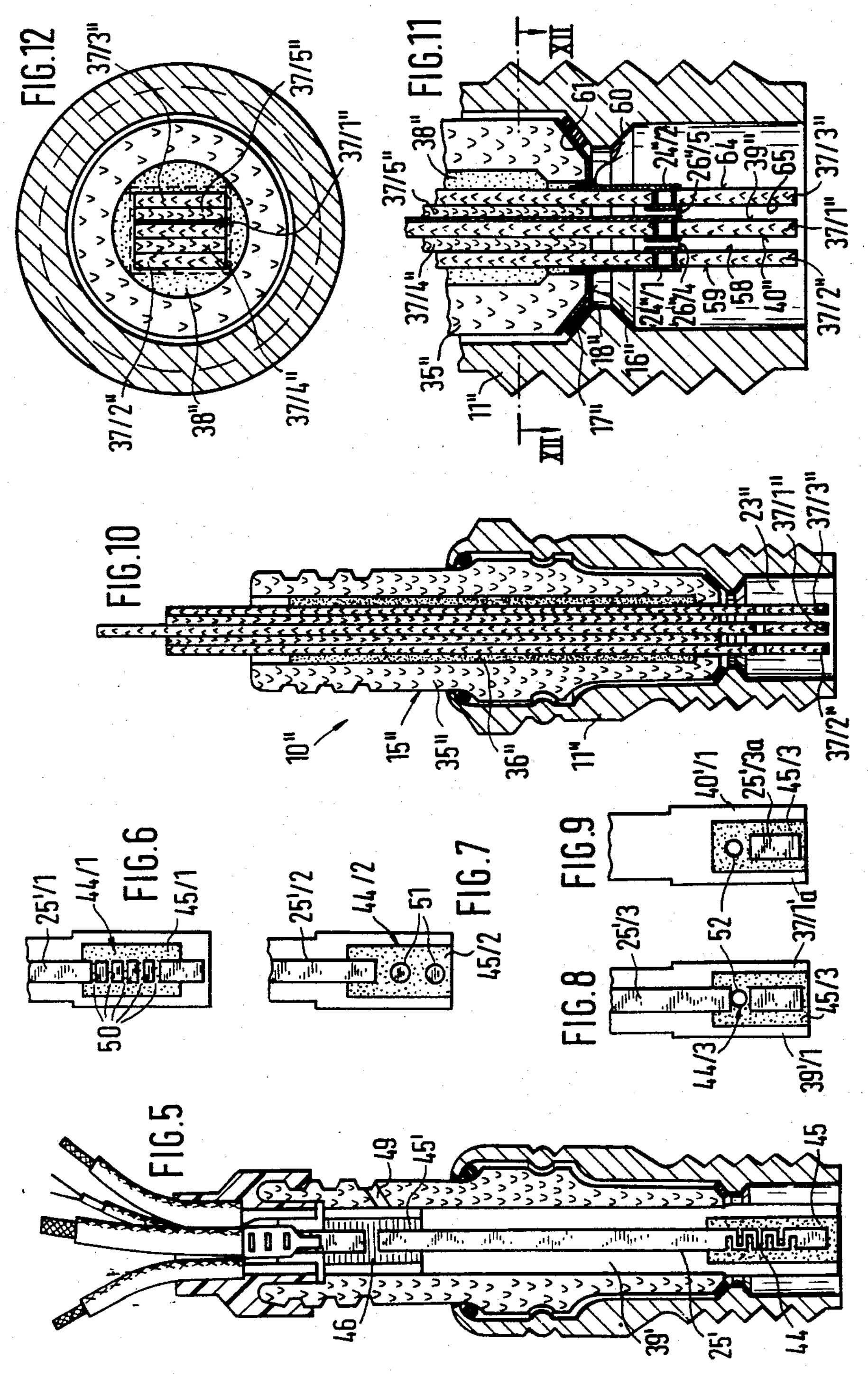
FIG. 5 shows the spark plug of FIG. 4 rotated by 90°.
FIG. 6 is a detailed view of an insulator with a surface discharge spark gap.
FIG. 7 illustrates another embodiment of a surface discharge spark gap.
FIG. 8 is a plan view of the front side of the insulator carrier with a dual surface discharge spark gap.
FIG. 9 is a rear view of the carrier of FIG. 8.
FIG. 10 is a longitudinal section similar to FIG. 1 of another embodiment, having a plurality of insulator carrier elements with layer-like sensing and heater components.
FIG. 11 is a greatly enlarged view of the ignition end portion of the spark plug of FIG. 10.
FIG. 12 is a cross section along line XII—XII of FIG. 11.

Embodiment of FIGS. 4 and 5: A spark plug 10′, in principle similar to the spark plug 10 of FIGS. 1 and 2, includes an air gap spark path 26′ and a surface discharge gap combined with an air gap spark path 26/1; additionally, the spark plug has a pre-spark path 46. In this example, as well as in the examples of FIGS. 6 to 9, various surface discharge paths 44/1 to 44/3 illustrate the ease with which a layer-like center electrode 25′ can be combined with different spark paths to provide spark plugs with respectively different characteristics, as required, for example, by different applications or different engines.

The spark plug 10′ has a plate insulator 37/1′, on which a center electrode 25, in form of a layer or track, is applied. The center electrode 25 continues in form of a conductive track towards the terminal region of the spark plug. In general, the materials, the method of manufacture, and the arrangement of the insulator plate 37/1′ and of the center electrode 25′ correspond to those having the same reference numerals and described in detail in connection with FIGS. 1 and 2. Additionally, and in the embodiment of FIGS. 4 and 5, the pre-ignition chamber 23′ has two spark gaps with respect to the insulator element 37/1′, namely:

(1) an air gap spark path 26′ and (2) a combined surface and air spark gap path 44-26/1.

The air gap 26′, in such spark plugs 10′, is used for starting in the internal combustion engine; the combined surface and air gap discharge path 44-26/1, however, is used after the engine has warmed up and is then kept clean by continuous burn-off of combustion residues from the surface discharge path 44 and by a relatively long spark path 44-26/1. This is of advantage with respect to accessibility of the fuel-air vapor to be ignition by the spark plug.

The center electrode 25′, in the region of the chamber 23′, has a meander shaped surface discharge path 44—see FIG. 5—preferably applied over a layer 45 of burn and spark-resistant material, for example beryllium oxide, which may be placed beneath the region of the surface discharge portion 44 of the electrode 25′. The end portion of the surface discharge path 44 adjacent the terminal end is spaced by a first air gap or spark gap 26/1 from a first ground electrode 24/1. The ignition end portion of the center electrode 25′ is spaced by a second air gap 26′ from a second ground or counter electrode 24′. The meander-shaped portion of the center electrode 25′ forms a surface discharge path 44, from which the spark jumps over the second air gap 26/1 to the second ground electrode 24/1, that is, over a combined surface and air gap path 44-26/1.

As is customary in surface discharge path electrodes, the center electrode 25′ has a pre-spark gap 46 located in its path. The pre-spark gap 46 is formed by an interruption in the center electrode 25′ (see FIG. 5). A suitable width of the gap 46 is 1.5 mm, preferably also placed over an intermediate layer 45′ which is highly burn and spark-resistant. A ceramic encapsulating material 47 surrounds the pre-spark gap 46, secured within the insulator body 35′. The ceramic encapsulating element 47 has an opening 48 which continues in the insulator element 35′ in form of a bore 49, to provide for venting of the pre-spark gap path 46. It is also possible to provide a sealed cap—not shown—as described, for example, in German Patent Disclosure Document DE-OS No. 20 56 235 (corresponding with U.S. Pat. No. 3,742,280, SIEGLE). If a tightly encapsulated pre-spark gap path is to be used, it can be built anywhere within the conductive track or path of the center electrode 25′.

The pre-spark gap path 46, and its encapsulating element 47, is bounded, with respect to the ignition end portion of the spark plug, by the sealing mass 38′ which seals the insulator plate 37/1 within the insulating body 35′.

FIG. 6 illustrates another embodiment of a surface discharge path 44/1, and is formed with a plurality of slit-like interruptions 50 in the end portion adjacent the ignition end of the center electrode 25'/1. Such a surface discharge path or track 44/1 is, likewise, placed over a burn or spark-resistant layer 45/1, for example of beryllium oxide. The remaining arrangement of the spark plug and of the center electrode corresponds to that shown in FIGS. 4 and 5.

In the embodiment of FIG. 7, the surface discharge path 44/2 is arranged in form of electrically conductive dots 51, for example in circular outline. The center electrode 25'/2, formed as a conductive track, thus terminates adjacent these conductive dots or circles 51. A high-temperature, burn-resistant layer 45/2 is located beneath the surface spark discharge path.

FIGS. 8 and 9 illustrate the ignition end portions of a first and second major side 39'/1 and 40'/1 of the insulating element **37/1'*a*. The first major side 39'/1 has a center electrode 25'/3 with a surface spark discharge path 44/3 thereon. In the region thereof, a through-hole 52 is formed in the insulating element 37/1'*a*. Sparks passing through this through-hole 52 may reach the second major side 40'/1 (FIG. 9) of the insulator plate 37/1'*a*, to be there conducted over a short conductive track or layer-like center electrode portion 25'/3*a*. In this arrangement of the center electrode 25'/3 and 25'/3*a*, an additional ground or chassis electrode is preferably arranged opposite the electrode portion 25'/3*a* facing the reverse major surface 40'/1 of the carrier plate 37/1'*a***.

The second major surface 40' of the insulating plate 37/1' has a layer-like heater, and, if necessary or desired, a layer-like temperature sensor applied thereto, both covered by an insulating layer. The sealing mass 38' at the respective sides of the insulator 37/1' is electrically insulating. It is possible to add metallic particles thereto, for example aluminum powder, in order to control and adjust the heat conductivity thereof without, however, detracting from its insulating properties. If the embodiment of FIGS. 8 and 9 is selected, than the heater and/or temperature sensor arrangement preferably terminates above the through-hole 52.

Embodiment of FIGS. 10–12:

The spark plug 10" has a tubular insulator 15" which differs from the insulators 15, 15' of the embodiments previously discussed in that the insulator 15" retains not only the insulating element 37/1" but additionally a second and third insulating plate-like element 37/2" and/or 37/3"; and, additionally, maintains the respective insulating plates 37/1", 37/2" and 37/3" spaced from each other, by further retaining insulating spacers 37/4" and 37/5". All these elements are retained in the longitudinal opening 36" of the tubular insulator body 35", and held therein sealed and tightly secured.

A further difference between the embodiment of the spark plug 10 and 10" is the formation of the ground or chassis or reference electrode 24"/1 and 24"/2. The details can be seen in the highly enlarged views of FIGS. 11 and 12, and the respective details of the coating of the insulating plates 37/1", 37/2", 37/3" are shown in exemplary form in FIGS. 13 to 16.

Figure 13:
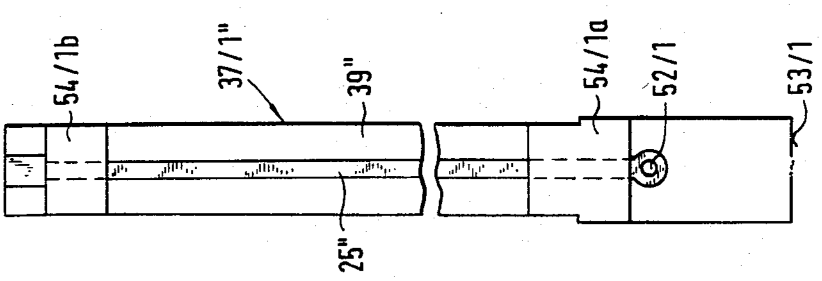

The first insulator plate 37/1" is made of aluminum oxide, and the first major surface 39" thereof has the track-like center electrode 25" applied thereto—see FIG. 13. The center electrode 25", in form of a longitudinal strip, similar to the center electrode 25 (FIG. 1), terminates in the region of the pre-ignition chamber 23". A through-hole 52/1 is formed in the insulating carrier element 37/1" surrounded by the electrode strip 25". Preferably, the electrode 25" continues through the hole 52/1 and reaches to the second major side 40" of the insulating plate 37/1", to there extend in a small circular zone, see FIGS. 11 and 14. The through-hole 52/1 has a diameter of, for example, 2 mm, and is spaced from the edge 53/1 of the insulating plate 37/1" by a distance of about 1 cm. The region between the ring-shaped portion of the center electrode 25", plated through the hole 52/1, and the insulator 35", as well as the region of the insulator element 37/1" at the terminal end, is covered with an insulating layer **54/1*a*, 54/1*b*, for example made of aluminum oxide and applied by printing-on. The insulating layers 54/1*a* and 54/1*b*** may have a thickness of, for example, 0.002 mm. Only the terminal connecting regions and the sparking regions are left unconvered.

Figure 14:
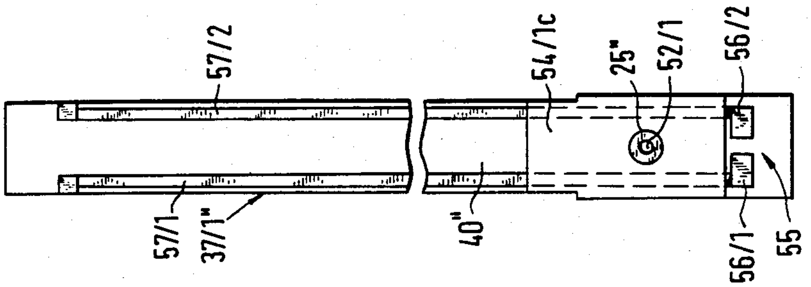

The second major side 40" of the first insulating plate 37/1" supports a sensor 55 which, for example, is an ion current sensor—see FIG. 14—and measuring between its layer-like electrodes 56/1 and 56/2 the electrical conductivity of the combustion gases. Such ion current sensors, by themselves, are known. In accordance with the embodiment of the present invention, the electrodes 56/1 and 56/2 are located at a distance of about 2 mm, and are positioned in the region of the pre-combustion chamber 23". The electrodes 56/1 and 56/2 as well as their connecting tracks 57/1, 57/2 applied to the insulator element 37/1" all contain platinum metal, preferably with additives of ceramic material, similar for example to the center electrodes 25, 25', 25". In order to prevent adulteration or falsification of measuring signals from the ion sensor 55, the conductive tracks 57/1, 57/2 are coated up to the insulator 35" by an insulating coating **54/1*c* which, in general, corresponds to the insulating layers 54/1*a* and 54/1*b*; only the electrodes 56/1, 56/2** are left uncovered.

Fourth and fifth insulator elements 34/4" and 34/5" are located adjacent the insulator 37/1". Preferably, they are plate-like and have the same dimensions as the insulator element 37/1", leaving the connecting region of the insulating element 37/1" uncovered. They terminate, at the ignition side, in the precombustion chamber 23". The thicknesses of the insulating elements 37/4" and 37/5" determines the lengths of the spark gaps 26"/4 and 26"/5, for example 0.8 mm. The insulating elements 37/4" and 37/5" are made of ceramic material, for example aluminum oxide. A second plate-like insulating element 37/2" (see FIG. 15), corresponding in width and thickness approximately to the insulating element 37/1", is fitted against the insulating element 37/4". The edge 53/2 of the insulating element 37/2" is aligned with or matches the edge 53/1 of the insulating plate 37/1". At the terminal end portion it is somewhat shorter, however, terminating flush with the insulating spacer element 37/4".

The first major side 58 faces the first insulating plate 37/2". The plate 37/2" has a through-hole 52/2 which is in axial alignment with the through-hole 52/1 in the insulating plate 37/1", and has, also, approximately the same diameter. The surface of the hole 52/2, and a small circular region surrounding the hole at the major side 58 of the insulating plate 37/2, and a short layer-like electrical conductive track 24"/1L at the second major surface 59 of the element 37/2" forms the first ground or chassis electrode 24"/1 of the spark plug 10". The short connecting conductor 24"/1L is connected by a brazed junction 60 with an electrically conductive layer 61 applied to the insulator body 35" and located at the end surface 16" thereof. The electrically conductive track 61 may be made of platinum metal with ceramic additives, and, for example, can be connected to the metal housing 11", preferably via a sealing ring 17" which can be electrically conductive.

The second major surface 59 of the insulating element 37/2", in addition to the ground or chassis or reference electrode 24"/1, also includes a layer-like heater element 32"/2 and a sensor 34"/2 to measure oxygen partial pressure of the combustion or combustion exhaust gases within the combustion chamber of the IC engine.

Figure 15:
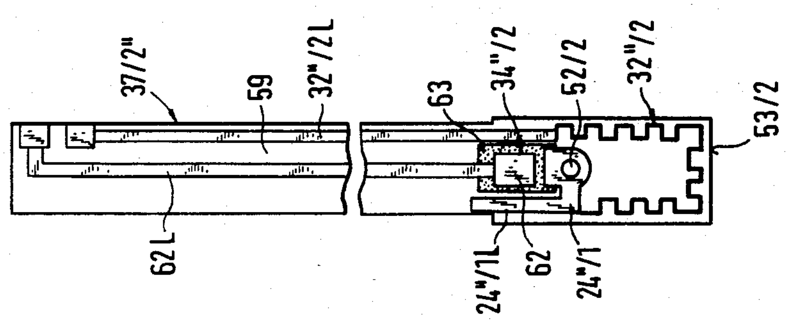

The heater element 32"/2, generally, is constructed similar to the heater element 32, FIG. 3. It differs from the heater element 32 only in that one of the electric connections, that is, the ground or return connection, is connected directly to the short connecting conductor 24"/1L of the ground electrode 24"/1, so that only a single insulated conductive track to the terminal region is needed for the insulating element 37/2" to energize the heater. This conductive track is shown in FIG. 15 at 32"/2L. The heater element 32"/2 is used to heat the combustion gases which are to be ignited, as well as to heat, and temper, the sensor 34"/2 on the insulator 37/2".

The oxygen sensor 34"/2 is spaced by about 1.5 mm from the layer-like region of the ground or return electrode 24"/1. Due to the platinum content in the ground electrode 24"/1, the ground electrode will have a catalytic effect on the gases to be measured, so that it can be used, simultaneously, as the first electrode of the oxygen sensor 34"/2. A second electrode 62 is applied to the second major surface 59 of the plate 37/2", made of a material which is less catalytically active than the material of the first electrode 24"/1, for example gold. The second electrode 62 is connected by a layer-like electric conductive track 62L with the connecting region of the second major surface 59.

The sensor is constructed by providing a layer of an oxygen ion conductive solid electrolyte 63 which, for example, and in known manner, is made of stabilized zirconium dioxide, and interposed between the electrode 24"/1, which further functions as the first electrode of the sensor 34"/2 and the second electrode 62 of the sensor. Oxygen sensors of this type and operating on the potentiometric principle, are known, see for example German Patent Disclosure Document DE-OS No. 28 55 012 (corresponding with U.S. Pat. No. 4 283 261, MAURER et al.). An electrically insulating porous protective layer is applied over the oxygen sensor 34"/2—not shown—and made, for example, of magnesium spinel. This is well known technology. The electrically insulating protective layer with respect to the heater 32"/2 likewise has been omitted from FIG. 2 for clarity of the drawing.

Rather than using a porous protective layer on the oxygen sensor 34"/2, the solid electrolyte layer 63 may be used therefor—if made porous—and both electrodes 24"/1 as well as 62 can be applied to the carrier 37/2" adjacent each other, both covered by the solid electrolyte body layer 63. The electrically conductive layer 62L of the second electrode 62 may have a resistance layer connected therein which has positive temperature coefficient (PTC) characteristics, to operate as a temperature compensation element for the oxygen sensor 34"/2—see German Patent Disclosure Document DE-OS No. 31 38 547, filed Sept. 28, 1981, WEYL. The heater element 32"/2, then, may not be needed since the working temperature of the oxygen sensor 34"/2 may not necessarily have to be kept at a uniform, constant temperature.

Figure 16:
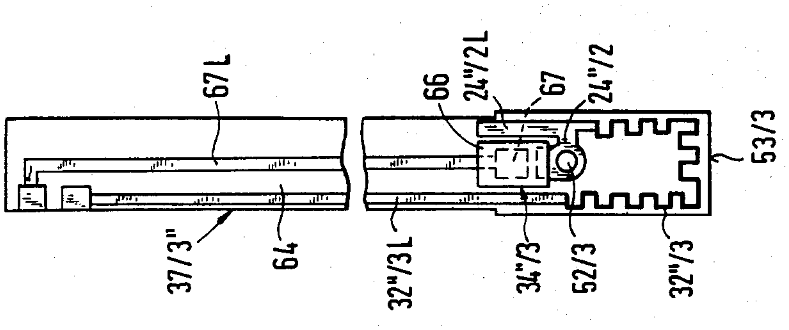
FIGS. 13 to 16 are plan views of the insulator elements used in the spark plugs of FIGS. 10 to 12, and showing circuit paths and operating elements on the plate-like carriers of the spark plug of FIGS. 10 to 12.

The fifth insulating element 37/5" is fitted with one major side 39" against the first insulating plate 37/1", and with its other major side against the third electrically insulating plate 37/3"—see FIG. 16. The insulating element 37/3" has a through-hole 52/3, in alignment with the through-hole 52/1 of the first insulating plate 37/1". It carries a second ground or reference or counter electrode 24"/2 and a heater 32"/3 which, in general, correspond to the similarly numbered elements 24"/1 and 32"/2 on the second insulating plate 37/2". The edge 53/3 of the third insulating plate 37/3" is flush with the edge 53/1 of the insulating element 37/1". The second major surface 65 of the third insulating plate 37/3" has a ring-shaped portion of the second ground electrode 24"/2. The first major side 64 carries, besides the major portion of the second ground electrode 24"/2 and the heater element 32"/3, additionally a sensor 34"/3 which forms a pressure sensor. Of course, the first major side 64 also carries the respective electrical conductors 24"/2L and 32"/3L for the electrode and the heater.

The pressure sensor 34"/3 is of layer-like construction and may, for example, include an oxygen ion solid electrolyte 66, applied in form of a layer over a portion of the second ground or chassis electrode 24"/2, forming a first electrode thereof, and a second layer-like electrode 67, which is so porous that Knudsen diffusion wil result—see British Patent Publication No. 2 049 952;+) and German Patent Disclosure Document DE-OS No. 31 22 861, filed June 10, 1981, DIETZ et al. The two electrodes 24"/2 and 67, located at a distance of about 1.5 mm from each other, have a constant direct voltage applied thereacross, for example of about 1 V. The second electrode 67 of the pressure sensor 34"/3, just as the first electrode of the ground or reference electrode element 24"/2, may be made of platinum metal with ceramic additive.

+) corresponding with U.S. Pat. No. 4,324,632

The pressure sensor 34"/3, selectively, may also operate as a sensor for oxygen partial pressure of the test gas, operating for example in accordance with the well known current limiting principle. The insulating protective coating for the heater 32"/3 was omitted from FIG. 17 for clarity of the drawing; such a protective layer which, in well known manner, may be made of aluminum oxide, would leave free the electrical conductive end portions of the conductive tracks 24"/2L. The second ground electrode 24"/2, the heater element 32"/3, and the sensor element 34"/3 all have one terminal connected by a brazed junction 60 (FIG. 11) which, in turn, is connected over an electrically conductive connecting track 61 on the end surface 16" of the insulating body 35" to the electrically conductive sealing ring 17", and hence electrically connected to the metal housing 11".

If the sensor 34"/3 is to be constructed in form of a temperature compensated sensor, one of the insulating elements 37/1", 37/2" or 37/3" should have a temperature sensor applied thereto—see for example FIG. 3—or a PTC resistor is to be included in the electrically conductive track 67L of the second electrode 67 of the sensor 34"/3, as described above in connection with the oxygen sensor 34"/2, see FIG. 15.

The insulating elements 37/2″, 37/3″ may be replaced by other types of structures; for example, rather than using insulating plates of aluminum oxide or other insulator ceramics, plate-like solid electrolytes made, for example, of zirconium dioxide, may be used—see for example German Patent Disclosure Documents DE-OS Nos. 28 55 012,[1)] 29 07 032,[2)] 29 09 201[3)].

[1)] corresponding with U.S. Pat. No. 4,283,261, MAURER et al. [2)] corresponding with U.S. Pat. No. 4,334,974, MÜLLER et al. [3)] corresponding with U.S. Pat. No. 4,277,323, MÜLLER et al.

Heater elements, temperature sensors, and the like can be applied on such carriers, if necessary with interposition of an insulating layer which may be applied by spraying, for example.

A suitable sealing mass 38″ is used to secure the insulating elements 37/1″, 37/2″, 37/3″, 37/4″ and 37/5″ in the insulator 35″, so that it is reliably held therein and sealed with respect to escape of combustion gases, pressure waves and the like. The insulating elements 37/1″ to 37/5″ are preferably sintered together, or encapsulated in a glass melt—not shown—by pouring a glass melt about the assembled insulator plates. The narrow width of the insulating elements 37/1″–37/5″ readily permits bonding of the insulating elements 37/1″–37/5″ within the insulator body 35 and within a metal housing of commercial spark plug construction.

Various changes and modifications may be made; for example, the spark plugs 10, 10′, 10″ may have heat pipes or heat conductors or heat tubes arranged in the respective metal housings 11, 11′, 11″, or may have sealing rings, typically the first sealing rings, constructed in the form of heat conductors—see, for example, German Patent Disclosure Documents DE-OS Nos. 31 09 896[1)] and 27 15 943.[2)]

[1)] filed Mar. 14, 1981, LINDER [2)] corresponding with U.S. Pat. No. 4,332,224, LATSCH et al.

It is also readily possible to arrange electrical resistance paths in the track or strip-like center electrodes 25, 25′, 25″. Catalytic layers can be applied in the region of the pre-combustion chambers 23, 23′, 23″ to assist in ignition of fuel-air mixtures; such catalytic layers or regions may, for example, include layers of nickel, platinum or rhodium, if necessary or desired with ceramic or glass-like additives. The pre-ignition or combustion chamber 23, 23′, 23″—is used—may, if needed, be closed at the ignition end, and formed with flame guide arrangements or structures.

Various other changes and modifications may be made, and any features described in connection with any one of the embodiments or drawings may be used with any of the others, within the scope of the inventive concept.

We claim:

1. Spark plug for an internal combustion engine having
   - a tubular metal housing (11, 11′, 11″) having a terminal end and an ignition end;
   - a ground or counter electrode (24, 24′, 24/1, 24″/1, 24″/2) located adjacent the ignition end;
   - an insulator (15, 15′, 15″) secured in the housing, said insulator being formed with a central opening (36);
   - and an ignition electrode (25, 25′, 25″) secured in the insulator and having an ignition end portion spaced from the ground or counter electrode by a spark gap, and a terminal end portion having terminal means for connection to a source of spark energy,
   - comprising, in accordance with the invention,
   - at least one elongated insulated carrier element (37/1, . . . ) having the form of a substantially flat plate or layer and being secured and sealed in the opening (36) of the insulator (15) and extending lengthwise thereof, said ignition electrode being positioned in the opening (36) of the insulator (15) by said elongated insulator carrier element and located in relation to the ground or counter electrode (24, . . . ) by said carrier element.

2. Spark plug according to claim 1, wherein said ignition electrode (25, 25′, 25″) is secured on and carried by said elongated insulator carrier element (37/1, . . . ).

3. Spark plug according to claim 1, wherein the elongated insulated carrier element (37/1, . . . ) is plate or layer-like, and said ignition electrode (25 . . . ) comprises a conductive strip or track applied on a major surface of the plate or layer-like carrier element, and is carried thereby.

4. Spark plug according to claim 1, further including an electrical heater element (32, . . . ) applied, in layer-like form, to one of said at least one elongated insulated carrier elements.

5. Spark plug according to claim 1, including an operating parameter sensing element (34, 55, 34″/2, 34″/3) located on at least one of the at least one elongated insulated carrier element;
   - and at least one electrically conductive track or strip forming a connection line carried on the respective insulated carrier element.

6. Spark plug according to claim 5, wherein the elongated insulated carrier element (37/1, . . . ) is plate or layer-like, and said ignition electrode (25, . . . ) comprises a conductive strip or track applied on a major surface of the plate or layer-like carrier element, and is carried thereby;
   - further including an electrical heater element applied, in layer-like form, to one of said at least one elongated insulated carrier elements;
   - and wherein all said heater element, sensor element, and the respective connection lines to the terminal end are in the form of layers, or flat strips or tracks.

7. Spark plug according to claim 6, including at least two elongated carrier elements, one of said carrier elements having said ignition electrode (25) applied thereto in form of a layer or strip-like conductive path;
   - a second carrier element being an elongated plate-like structure similar to said first carrier element and carrying an operating parameter sensor (34, 55, 34″/ 2, 34″/3);
   - and at least one electrical heater element (32, 32″/2, 32″/3) applied to at least one of said carrier elements;
   - and wherein said carrier elements are assembled in a parallel stack, and secured in said central opening (36) of the insulator (15, 15′) by a sintered or fused sealing mass (38).

8. Spark plug according to claim 5, wherein said sensor element (34″/2, 34″/3) comprises a gas composition sensor.

9. Spark plug according to claim 5, wherein said sensor element (34″/3) comprises a pressure sensor.

10. Spark plug according to claim 5, wherein said sensor element includes an oxygen ion conductive solid electrolyte body (63, 66).

11. Spark plug according to claim 5, wherein said sensor element comprises a temperature sensor (34).

12. Spark plug according to claim 5, wherein said sensor element comprises an ion current sensor (55).

13. Spark plug according to claim 1, including sealing seating and retention means (17, 18, 19, 20, 21) retaining the insulator within the metal housing in sealed manner;

and means (38) sealingly retaining the insulated carrier element within the opening (36) of the insulator.

14. Spark plug according to claim 13, wherein the insulated carrier element comprises at least one elongated plate having a ceramic, insulating outer surface;

the insulator (15) comprises a ceramic body (35);

and the means sealingly retaining the insulating carrier element in the opening comprises a sintered or fused sealing mass, joining the ceramic insulator and the ceramic surface of said carrier element.

15. Spark plug according to claim 1, wherein the metallic housing (11, 11', 11") has an extending portion, and the ground or counter electrode (24, . . . ) is located within said extending portion to place the spark gap (26, 26', 26/1, 26"/4, 26"/5) between the center electrode (25, 25', 25") and the ground or counter electrode (24, . . . ) within said extending portion of the metal housing.

16. Spark plug according to claim 1, (FIGS. 10 to 12; 15, 16) further including an electrical heater element applied, in layer-like form, to one of said at least one elongated insulated carrier elements;

and wherein the heater element has a return connection line (24"/1L, 24"/2L) and is electrically connected to and forms part of a connection line for the ground or counter electrode (26"/4, 26"/5).

17. Spark plug according to claim 1, wherein the ground or chassis electrode comprises an elongated carrier element (37/2", 37/3");

spacer means (37/4", 37/5") spacing the elongated carrier elements of the ground or chassis electrode from the insulated carrier element (37/1") positioning the ignition electrode (25");

electrode means (25"; 24"/1, 24"/2) on said carrier elements and respectively forming the ignition electrode and the ground or return electrode;

and connection means (24"/1L, 24"/2L) on the elongated carrier elements of the ground or counter electrodes, and electrically connected to the metallic housing.

18. Spark plug according to claim 1, wherein (FIGS. 10 to 12; 13, 14) the elongated insulated carrier element (37/1") is formed with a through-opening (52/1) in the region of the end portion of the ignition electrode (25") said ignition electrode being applied to a surface of the insulated carrier element, and the through-hole having an electrically conductive portion;

an ignition electrode zone connected to said electrically conductive portion at the side opposite of the ignition electrode, said opening, and the ignition electrode zones surrounding the opening being located in the vicinity of the ground or counter electrode;

and wherein said ground or counter electrode has portions facing the zones of the ignition electrode on both sides of the insulated carrier element.

* * * * *